Oct. 5, 1965  LEO MORI ETAL  3,209,642
DIGITAL CONVERTER OF PHOTOMETRIC VALUE
Filed March 30, 1962

3,209,642
DIGITAL CONVERTER OF PHOTOMETRIC VALUE
Leo Mori, Tokyo, and Isamu Niikura, Hiratsuka-shi, Japan, assignors to Tokyo Shibaura Electric Co., Ltd., Kawasaki-shi, Japan, a corporation of Japan
Filed Mar. 30, 1962, Ser. No. 183,938
Claims priority, application Japan, Apr. 1, 1961, 36/11,178
5 Claims. (Cl. 88—14)

The present invention relates to digital converters of photometric value and particularly to those for converting the photometric value of a sample directly into electric pulses by a photoelectric receiver.

In the past, analog computation has generally been employed in determining the tristimulus values of a sample substance from its spectrophotometrically measured value such as spectral reflectance or spectral transmittance. It is obvious, however, that from the standpoint of computation accuracy, it is preferable to perform computation in a digital fashion by transforming the photometric value of the sample into digits at the initial stage of computation. An apparatus based upon such consideration is an analog-to-digital converter of photometric value employed by W. E. White and D. L. MacAdam (see "Journal of Optical Society of America," vol. 47, p. 605, 1957). This converter is designed to give a magnetic tachometer an angle of rotation proportional to the photometric value by means of a mechanical differential device so that the pulses generated in succession by said tachometer may be utilized in groups each including pulses corresponding in number to the photometric value. With this converter, the accuracy of the analog-to-digital conversion is dependent upon the mechanical accuracy of the differential device and the tachometer, necessitating an extreme mechanical accuracy in the manufacture of these elements.

The present invention is designed to minimize the loss of accuracy of the analog-to-digital conversion due to limitations to the machining accuracy by converting a displacement produced in the photometric device in proportion to the photometric value obtained therewith immediately into a digital quantity at the very point where the displacement is produced, without insertion of any mechanical transmission. To this end, the invention resorts to optical means for direct conversion of the displacement to a corresponding number of pulses. Specifically, there are provided in a double beam photometer a finely divided scale which is integral with an light attenuator inserted in the reference beam such as a photometric comb, a photometric wedge or a polarizer which attenuates a standard beam until the standard beam balances with a sample beam by varying the relative position between the standard beam and the light attenuator. The finely divided scale also moves corresponding to the variation of the photometric value of the sample beam being measured, and a separate mechanism for driving a light so as to scan said scale at a rate higher than that of said variation in relative position of the light attenuator, and also a photoelectric receiver for receiving the light finely divided through such scanning. Thus, according to the present invention the necessity for any mechanical transmission of the displacement before digital conversion is eliminated and thus any loss of accuracy due to mechanical inaccuracy such as backlashes is completely avoided. Also, since the pulses produced invidually correspond to respective positions of a mechanical part which effects the displacement, it is possible at all times completely to proportionate the number of pulses produced to the photometric valve obtained, even when the displacement is in non-linear relation with or not completely proportional to the photometric value, by providing graduations for pulse formation arranged for correction of the non-linearity.

One object of the present invention is to realize digital representation of a displacement which is proportional to the photometric value obtained with a sample by a photometer.

Another object of the present invention is to accurately convert such displacement to electric pulses thereby to improve the accuracy of computation.

Other objects and advantages of the present invention will be apparent from the following descripiton when read with reference to the accompanying drawings, in which.

Figure 1:
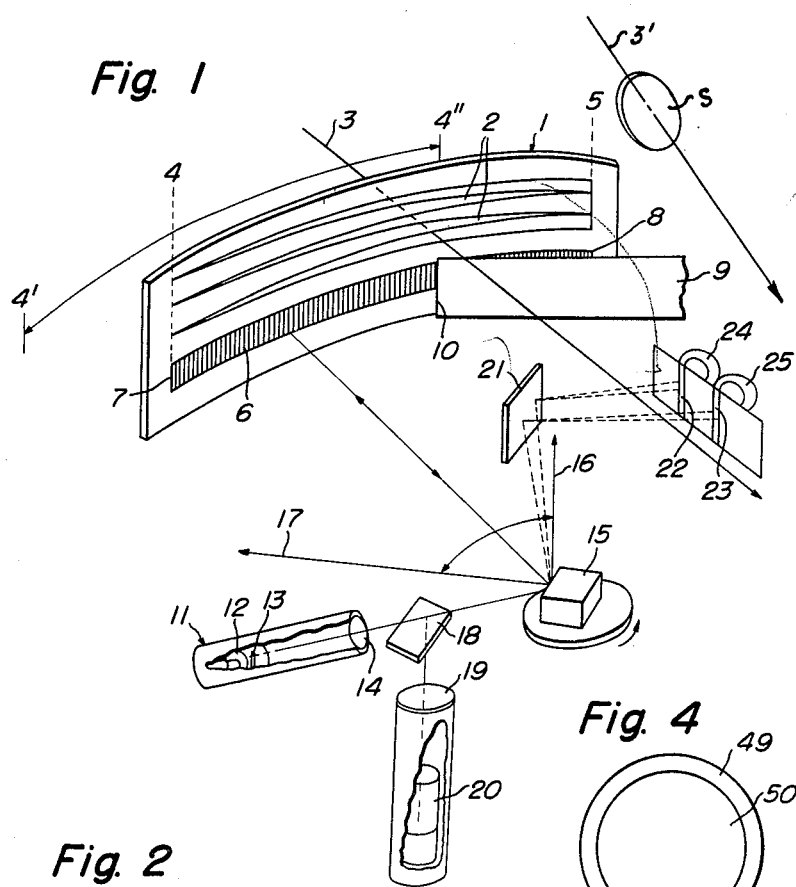
FIG. 1 is a schematic perspective view showing one embodiment of the present invention employing a photometric wedge as a light attenuator and adapted for reflective scanning.

Referring first to FIG. 1, numeral 1 designates a plate frame shaped as a portion of a cylinder and movable circumferentially thereof. Set in the upper half portion of said plate frame is a photometric comb 2 adapted to provide light transmission proportional to the position of the plate frame 1. A standard light beam 3 and a sample light beam 3' are arranged to be received in the same photometric receiver (not shown). The photometric comb 2 serves to intercept the standard light beam 3 to control the quantity of light transmitted. When a sample S is inserted in the sample light beam 3' to reduce the light transmitted along the beam, the photometric comb located in the standard beam is displaced so as to compensate for the reduction. The largest extent of such displacement is represented by the distance between two limit positions 4', 4'' assumed by one end 4 of the photometric comb 2. Set in the lower half portion of the plate frame 1 are a row of mirror facets which define graduations forming a mirror scale, the opposite extremities of which correspond to the respective ends 4, 5 of the photometric comb 2. The mirror scale has a total number of graduations, for example, of 500, corresponding to respective points on the photometric comb affording a percent transmission of 0.1, 0.3, 0.5, 0.7, . . . 99.7, 99.9, respectively. Preferably, the spacings between the adjacent mirror facets and the opposite sides of the row of such mirror facets form a black coated face. Fixed on the front side of the row of mirror facets is a black screen plate 9 having one end 10 disposed immediately below the standard beam.

Numeral 11 designates a light source unit provided therein with an electric lamp 12 and a slit 13, the image of which is projected through a lens 14. Numeral 15 designates a polyhedral mirror located at the center of curvature of the cylindrical surface defined by the plate frame 1 and adapted to rotate at a speed much higher than the angular displacement of the plate frame 1. The image of the slit is focused on the surface of the mirror scale 6 by means of the polyhedral mirror 15 and the image thus focused scans the mirror scale 6 to reach an angular position 17. The scanning image is reflected as pulses by those mirror facets which are positioned between one extremity 7 of the mirror scale 6 and the extremity 10 of the screen plate 9, the reflected light being again reflected by the revolving mirror 15 and then downwardly by a semi-transparent mirror 18 (or a reflecting mirror slightly offset from the light path on the illuminating side) to pass through a lens 19 to impinge upon the light-receiving surface of a photomultiplier tube 20. As a result, the photomultiplier tube 20 produces groups of output pulses, the number of output pulses in each group being proportional to the number of mirror facets lying between 10 and 7, that is, to the percent transmission of the photometric comb 2 or the photometric value of the sample being measured.

A portion of the scanning light is reflected by a mirror 21 to pass through slits 22 and 23 in succession to excite respective photoelectric tubes 24 and 25 so that the output of one of said photoelectric tubes 24 may be utilized as a stop pulse for indicating the termination of the preceding group of pulses and that the output of the other photoelectric tube 25 may be utilized as a starting pulse indicating the beginning of the following group of pulses.

It will be apparent from the foregoing that the optical arrangement shown in FIG. 1 is capable of providing pulse groups each including pulses of the number proportional to the displacement of the photometric comb or the photometric value of the sample being measured and a starting and a stopping pulse for discriminating the groups of pulses from each other.

Further, the displacement of the photometric comb 2 and the number of pulses in each group correspond completely to each other, since the photometric comb 2 and the mirror scale 6 as a means of pulse formation are in integrally fixed relation with each other completely eliminating any mechanical play which might otherwise interfere with the correspondency. Additionally, since there is a perfect correspondency between the individual mirror facets and the respective positions of the photometric comb 2, the number of pulses in each group of pulses may be rendered at all times proportional to the percent transmission of the photometric comb by arranging the mirror facets so as to correspond to the varying percent transmission of the photometric comb even if the percent transmission of the photometric comb does not vary linearly along the length thereof. Such precise correspondency has been realized for the first time by the arrangement and construction of the present invention. It is evident that the photometric comb shown in FIG. 1 may be replaced by a suitable photometric wedge such as a neutral grey wedge.

Figure 2:
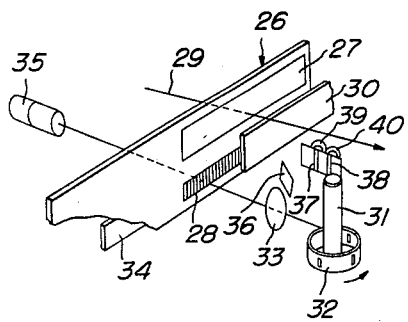
FIG. 2 is a schematic perspective view showing another embodiment of the present invention adapted for transmissive scanning.

Various optical methods are utilizable for converting the movement of a scale integral with a photometric comb, a photometric wedge or other like light attenuator element into a number of pulses. Though the optical arrangement shown in FIG. 1 is of the reflection type, the transmission type may also be employed where a sufficient space is available. In this case, the light attenuator and scale may be in non-cylindrical or planar form. FIG. 2 illustrates one example of the transmission type. In this figure, numeral 26 indicates a plate frame having a photometric wedge 27 and a scale 28 mounted integrally thereon. The plate frame 26 is also laterally movable in accordance with the photometric value of the particular sample being measured. Numeral 29 designates the standard beam of the photometer. The scale 28 includes graduations in the form of slits formed to transmit only those rays which fall in the slit and arranged similarly to the mirror facets in the first embodiment shown in FIG. 1. A screen plate 30 is provided to intercept those rays to the right of the one passing directly below the standard beam 29. A slotted plate 32 is arranged to traverse the front face of a source of diffused light 31 so that the images of the respective slits formed in the plate 32 are focused on the surface of the scale 28 by a lens 33 to scan the scale surface. Pulses of light passing through the scale to the rear thereof are focused on the photoelectric surface of a photomultiplier tube 35 by a Fresnel lens 34 to produce a group of electric pulses. A mirror 36 may produce a starting and stopping pulse from a portion of the scanning light by means of slits 37, 38 and photoelectric tubes 39, 40.

Figure 3:
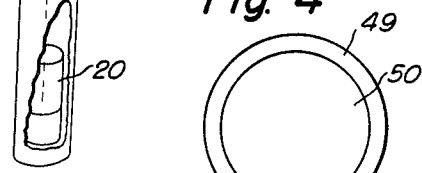
FIG. 3 is a similar view of a further embodiment of the present invention utilizing the flying spot of a cathode ray tube as a light source.

In the transmission type of arrangement, the optical system may be simplified by use of a cathode ray tube in the scanning section, as illustrated in FIG. 3. Referring to FIG. 3, there is provided a movable plate frame 41 having mounted thereon a photometric wedge 42 for controlling the standard beam 43 and a transmissive scale 44 with a screen plate 45 secured to the front side thereof. A cathode ray tube 46 is disposed on the rear side of the scale 44 as shown so that, when a sawtooth-like form of voltage is applied along the transverse axis of the tube, its flying spot scans the scale surface and the light rays passing through the scale fall upon the photoelectric surface of a photoelectric tube 48 by way of a lens 47 to produce pulses in groups each including pulses of the number proportional to the photometric value. In this case, a stopping and a starting pulse signal may be formed from the inlet signal to the cathode ray tube.

Figure 4:
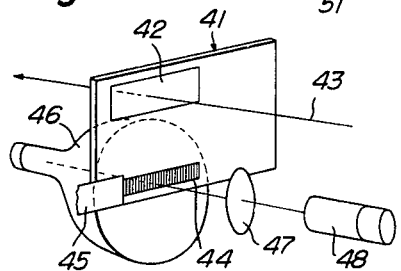
FIG. 4 is a front view of a polarizer employed as a light attenuator showing its relation with the scale.

As a means for controlling the standard beam in a double beam photometer, a train of polarizers is frequently utilized in place of a photometric comb or a photoelectric wedge such as described above. It is to be understood that the present invention may also be applied to such combination. In this case, the cosine of the angle of rotation of the one of the polarizers is proportional to the photometric value of the sample being measured. Accordingly, as shown in FIG. 4, a polarizer 50 may be set in a rotatable plate frame 49 concentrically therewith with a scale 51 of the transmitting or reflecting type secured to the periphery of the plate frame 49 along a portion thereof and having graduations spaced apart in accordance to the cosine of the angle of rotation of the polarizer so as to produce pulses corresponding in number to the cosine of the angle of rotation of the polarizer and hence to the photometric value obtained.

What is claimed is:

1. In a double beam photometer having a standard beam and a sample beam, a digital converter of photometric values comprising a light attenuator means which attenuates the standard beam until it balances with the sample beam by varying the relative positions of the standard beam and the light attenuator means, a finely divided scale integral with said light attenuator means to move in accordance with the variations of the photometric value of the sample beam being measured, a fixed mask masking a portion of said scale and oriented relative thereto to determine the remaining portion of said scale to be scanned, a light scanning mechanism adapted to project a spot of light on the surface of said finely divided scale and move it relative thereto at a rate higher than the relative movement rate of the standard beam and light attenuator means, and a photometric receiver means disposed to receive finely divided light segments produced by the scanning of the scale.

2. The device of claim 1, wherein said light attenuator means comprises a photometric comb having a configuration in accordance with a cylindrical segment, a cylindrical frame adapted to carry said segment along a circumferential path to a position where the standard beam balances with the sample beam, said scale comprising a plurality of mirror facets disposed in parallel relation along the inner circumference of said cylindrical frame, said light scanning mechanism comprising a slotted light source and a polyhedral mirror for scanning said scale with an image of said light source, and said photometric receiver means comprising photoelectric responsive means disposed to receive the light reflected by said scale in the form of said finely divided light segments as a result of said scanning.

3. The apparatus of clam 1, wherein said light attenuator means comprises a photometric wedge adapted for reciprocating movement to balance the standard beam with the sample beam, said scale comprises a member integral with the wedge and including a plurality of slits disposed in parallel relationship one to another, said light scanning mechanism comprises a source of diffused light and a slotted plate adapted to rotate relative to the source at a peripheral speed higher than the rate of relative movement speed of the wedge to produce said scanning action, and said photometric receiving means being disposed relative to the slitted scale to receive light therethrough as said finely divided light segments.

4. The apparatus of claim 1, wherein said light attenuator means comprises a photometric wedge adapted for said relative movement to balance the standard beam with the sample beam, said light attenuator means comprises a member having parallel slits, said light scanning mechanism comprises a cathode ray tube adapted to scan the scale with a flying spot of light, and said photometric receiver means are disposed relative to the slitted member to receive light transmitted through the scale as a result of said scanning.

5. The apparatus of claim 1, wherein said light attenuator means comprises a train of polarizers, one of said polarizers being arranged to rotate in its plane to attenuate the standard beam until it balances with the sample beam, said scale being deployed on the surface of said one of the polarizers integrally and concentrically therewith, and said light scanning mechanism being adapted to move the spot of light on said scale at a speed higher than that of rotation of said one of the polarizers, said photometric receiver means being disposed to receive the light transmitted from the scale in the form of said finely divided light segments.

References Cited by the Examiner

UNITED STATES PATENTS

| 2,218,253 | 10/40 | Weaver _____ 88—14 |
| 2,450,761 | 10/48 | MacNeille _____ 88—14 |
| 2,471,788 | 5/49 | Snyder et al. _____ 250—233 |
| 2,883,649 | 4/59 | King _____ 250—227 X |

OTHER REFERENCES

White et al.: "Universal, Digital Tristimulus Integrator," Journal of the Optical Society of America, volume 47, No. 7, July 1947, pages 605 to 611.

JEWELL H. PEDERSEN, *Primary Examiner.*